June 2, 1964  C. C. ROE  3,135,111
EDDY CURRENT DYNAMOMETER
Filed Sept. 20, 1962  2 Sheets-Sheet 2
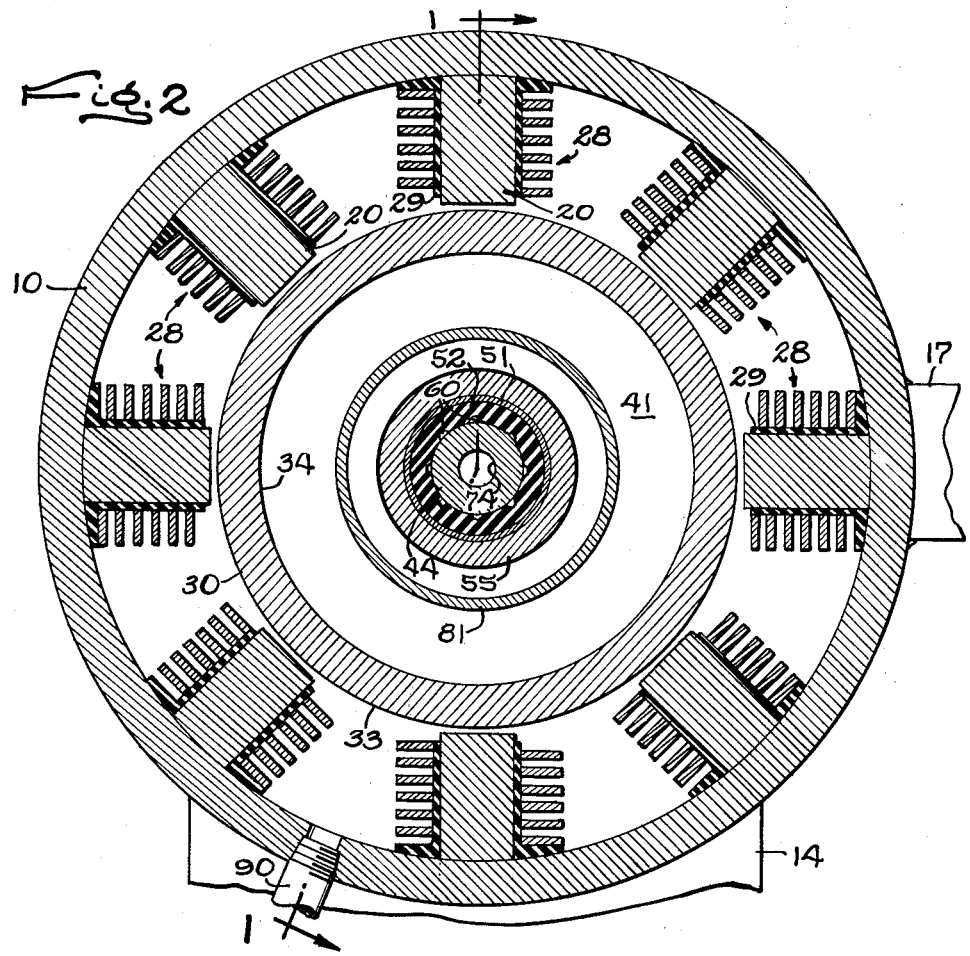
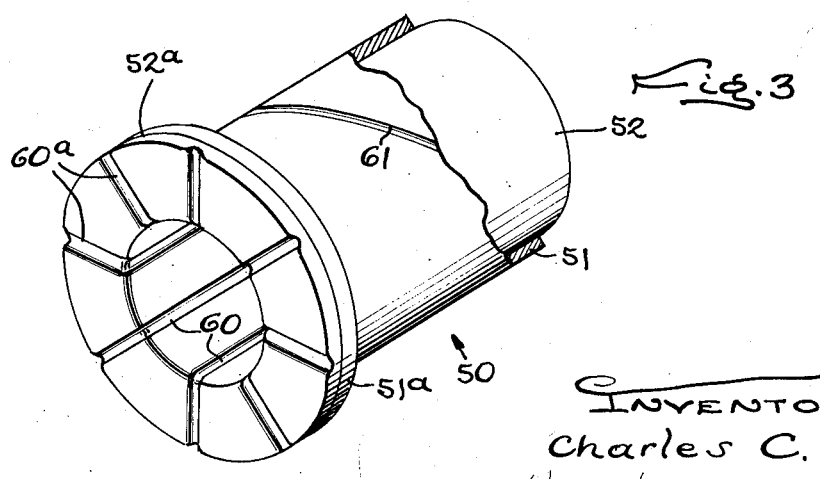
INVENTOR
Charles C. Roe
Wolfe, Hubbard, Voit & Osann
ATTORNEYS

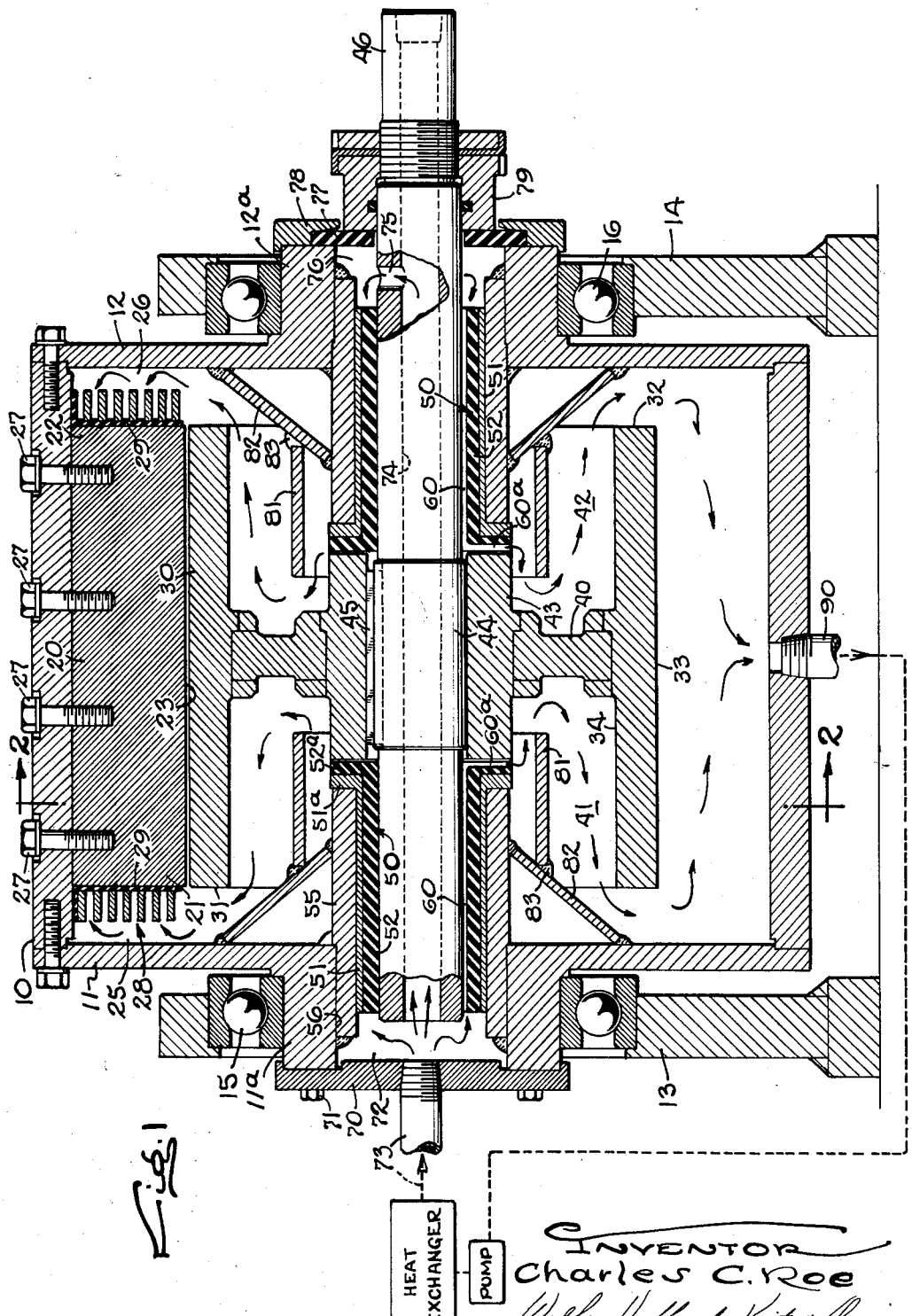

United States Patent Office 3,135,111
Patented June 2, 1964

3,135,111
EDDY CURRENT DYNAMOMETER
Charles C. Roe, Rockford, Ill., assignor to Warner Electric Brake & Clutch Company, South Beloit, Ill., a corporation of Delaware
Filed Sept. 20, 1962, Ser. No. 225,002
12 Claims. (Cl. 73—134)

The present invention relates to dynamometers and more particularly to a fluid cooled eddy current dynamometer having D.-C. excitation.

It is an object of the present invention to provide a dynamometer which is capable of operation over a wide range of speed and torque and which has a large power dissipation capability per unit volume. It is a more specific object to provide a dynamometer which is capable of operating at rotative speeds which are beyond the capability of conventional dynamometers, speeds up to 15,000 r.p.m. or even greater. Consequently, it is an object to provide a dynamometer which may be universally used in a shop or on a test floor to satisfy a wide range of dynamometer requirements and making it unnecessary to invest in special dynamometers for operation under extreme conditions of speed or torque.

It is a related object to provide a dynamometer in which the energy in the rotor in the form of heat produced by eddy currents is efficiently transferred to the cooling fluid and in which there is no possibility of excessive temperature or local hot spots even under heavy load conditions. In the present construction the rotor is formed by a hollow cylindrical eddy current rings in which substantially all of the surface area both inside and outside of the ring is constantly scrubbed by the flow of cooling fluid.

It is another related object to provide an eddy current dynamometer having a novel bearing arrangement permitting successful operation at high rotative speeds. More specifically, a composite bearing is provided consisting of a rigid bearing sleeve and a resilient sleeve of rubber or the like telescoped together on the shaft so dimensioned and arranged that relative movement takes place at the surface of the rigid sleeve for slow speeds of rotation and at the surface of the rubber sleeve when operating at high speeds. In this connection it is an object of the invention to provide a novel lubricating and cooling arrangement for the bearing which insures proper lubrication of all relatively moving surfaces and which provides for positive flow of cooling and lubricating fluid through the bearing structure at a high volumetric rate to maintain the bearings at a low temperature. It is a more detailed object of the invention to provide an eddy current dynamometer having a special high speed bearing construction and in which the same fluid which cools and lubricates the bearings is all subsequently utilized in the withdrawal of heat from the eddy current element.

In another, but related, aspect of the invention it is an object to provide an eddy current dynamometer which includes a novel deflector arrangement for directing the fluid from the bearings past the surface of the eddy current ring and into annular end spaces where fluid is circulated for cooling of the pole structure prior to discharge; consequently, it is an object to provide an eddy current dynamometer having efficient means for dissipating heat from the exciting windings surrounding the pole structure.

In one of its aspects it is an object of the invention to provide an eddy current dynamometer having fluid cooled bearings at its ends and having novel means for conducting the fluid along the shaft while preventing leakage outside of the machine.

It is a general object to provide an eddy current dynamometer which, in spite of its operating capabilities and high power dissipation may nevertheless be constructed at low cost using simply formed parts and without adherence to close tolerances. Finally, it is an object to provide an eddy current dynamometer which is capable of high speed operation and which may be operated either on an intermittent basis continuously over long periods of time without care or maintenance.

Other objects and advantages will become apparent upon reading the attached detailed description and upon reference to the drawings in which:

FIGURE 1 is a longitudinal section, taken in elevation, of an eddy current dynamometer constructed in accordance with the present invention, looking along the line 1—1 in FIG. 2.

FIG. 2 is a transverse section taken along the line 2—2 in FIG. 1.

FIG. 3 is an enlarged perspective showing the composite sleeve employed in the bearings of the machine of FIGS. 1 and 2.

While the invention has been described in connection with a preferred embodiment, it will be understood that I do not intend to be limited to the embodiment shown but intend to cover the various alternative and equivalent constructions included within the spirit and scope of the appended claims.

Turning now to the drawings, a dynamometer constructed in accordance with the invention has a housing 10 of steel or similar magnetic material enclosed by end members 11, 12. The latter are provided with collars or trunnions 11a, 12a rockably supported on frame members 13, 14 with ball bearings 15, 16 being interposed. The torque developed within the device is transmitted to a suitable force measuring device as, for example, a scale, by means of an arm 17 suitably secured to the housing by welding or the like and only a portion of which is shown (FIG. 2).

Extending longitudinally within the housing and peripherally spaced from one another are a series of pole members 20 of magnetic material each having ends 21, 22 and a centrally facing pole face 23. The ends 21, 22 define annular end spaces 25, 26 within the housing and the pole faces 23, taken together, define a cylindrical rotor space. The pole members 20 are preferably secured to the housing by means of bolts 27 entering holes suitably tapped.

Surrounding each of the poles 20 is a winding 28 which is preferably in the form of an edge-wound conductor having radially spaced convolutions which may, if desired, be of bare metal insulated from the pole members by a layer of insulation 29. The significance of the particular winding arrangement and the end spaces 25, 26 will become clear as the discussion proceeds. It will suffice to say for the present that the windings 28, which may be connected in series with one another, are wound in a direction to produce adjacent north and south poles with the flux therefrom extending into the rotor space.

For the purpose of cooperating with the poles 20 a rotor is provided in the form of a cylindrical eddy current ring 30 having ends 31, 32, a cylindrical outer face 33, and a heat-transferring inner face 34. The ring 30 is made of copper or similar conducting material. For the purpose of securely mounting the eddy current ring while maintaining substantially all of its inner surface available for heat transfer, the ring is mounted upon a central flange or spider 40, which, because of its central position, serves to divide the space within the ring into symmetrical compartments 41, 42, respectively. The spider is secured to an inner hub 43 which is mounted upon a longitudinally extending shaft 44, being keyed to the latter by a key 45. The shaft terminates in a driving end, or connection, 46 which is coupled to the power source to be measured. It will be apparent, then, that upon rotation of the shaft and the eddy current ring 30 connected to it, eddy currents will be set up in the latter which, in turn, set up a magnetic field which reacts against the stationary field to apply torque to the housing 10, the amount of torque being dependent upon the amount of direct current which flows through the exciting windings. The windings are preferably of heavy gauge so that the excitation voltage may be low. Control of the current is a matter well within the skill of the art.

In accordance with the present invention a composite bearing structure is provided for supporting the shaft 44 at its ends including a rigid bearing sleeve of anti-friction material and a resilient bearing sleeve of rubber or the like telescoped together and so arranged that the rigid sleeve is active at slow speeds of rotation, particularly incident to start-up, following which the rubber sleeve performs the bearing function under high speed running conditions. Referring to the drawing, the composite bearing sleeve indicated at 50 includes a sleeve 51 of bronze or similar rigid anti-friction material and a rubber sleeve 52. The sleeves have mating, outwardly extending flanges 51a, 52a, respectively, at the inner ends. For the purpose of cooperating with, and supporting, the rigid sleeve 51, stationary sleeves 55 are secured, as shown, preferably by welding, to the respective end members of the housing. To insure that the stationary sleeves are centered with reasonable accuracy, they are filled into alined openings 56 formed in the trunnions 11a, 12a integral with the end members. The bearing assembly at the opposite end forms a mirror image of that just described and corresponding reference numerals have been employed.

In carrying out the present invention means are provided for supplying cooling and lubricating fluid under pressure to the ends of each of the bearing assemblies, with the fluid being conducted through the assemblies via longitudinal porting and thence to the interior of the housing for cooling of the eddy current ring. The fluid may, for example, consist of an emulsion of oil in water. In the present instance longitudinal grooves are provided at the inner face of the rubber sleeve for conducting the fluid in large volume, with the fluid being available at the interface between the moving parts to perform an efficient lubricating function. Thus referring to FIG. 3, the rubber sleeve 52 is provided with longitudinal grooves 60 which are spaced at equal increments about the inner surface and which terminate in groove extensions 60a formed in the flange 52a with the result that the cooling and lubricating fluid is caused to make a right angled turn from the bearing into the dynamometer housing. Such fluid also serves to lubricate the interface between the outer bearing sleeve 51 and the stationary sleeve 55. To facilitate entry of the fluid, the outer surface of the sleeve 51 may be formed with one or more shallow helical grooves 61 as shown in FIG. 3. Or, if desired, dependence may simply be placed upon the natural seeping of the fluid between the sleeves since the sleeve 51 is active only at slow speeds.

Novel means are provided for conducting the cooling and lubricating fluid under pressure to the bearings at both ends of the machine while making a simple connection of the fluid conduit to one end only. Thus, as shown in FIG. 1, the left hand end of the machine is enclosed by a cap 70 which is secured to the trunnion 11a by a ring of bolts 71 to define a fluid entry chamber 72. The fluid is admitted to this chamber through a conduit 73. Since the aggregate cross sectional area, particularly of the grooves 60 in the rubber sleeves, is substantial, it will be apparent that fluid may be conducted at a high volumetric rate, i.e., at a rate which is sufficient to perform the subsequent cooling of the eddy current ring. For the purpose of conducting the fluid to the opposite bearing, the shaft 44 has a central bore 74 which terminates in one or more radial openings 75 which lead into a second fluid chamber 76. Such chamber performs the same function as the chamber 72 at the opposite end so that fluid is conducted at an equally high rate through the right hand bearing, For preventing escape of fluid from the chamber 76, the trunnion 12a preferably mounts an annular resilient sealing member 77 which is clamped in place by a circular clamp 78. The inner edge of the sealing member 77 bears against a sealing hub 79 which is secured to the right hand end of the shaft. It is found that the back pressure developed in the chamber 76 is effective to maintain sealing contact between the sealing element 77 and the hub 79 so that there is no risk of escape of fluid along the shaft. While the disclosed form of fluid seal has the advantage of simplicity and economy of space, it will be understood that the invention is not limited thereto and that other types of face seals intended for high speed operation, and which are commercially available, may be employed if desired.

In accordance with one of the aspects of the present invention the anti-friction sleeve 51 and rubber sleeve 52 are so dimensioned with respect to the stationary sleeve 55 and shaft, respectively, that they operate in sequence from start-up to the high speed running condition. Thus the sleeve 51 has slight clearance with respect to the stationary sleeve 55 which, in the case of a sleeve having a diameter of about three and one-half inches, may be on the order of 0.0005 inch. This is adequate to permit free movement of the parts 51, 55 at low speed but there is, nevertheless, a drag torque upon the sleeve 51 at high speed because of the large area of the bearing surfaces and the fluid friction developed at such surfaces. Turning to the rubber sleeve 52, a snug resilient fit is provided between the sleeve and the shaft which it engages so that the torque exerted upon the sleeve must be built up to a certain "breakaway" value before relative rotation may occur. It will, of course, be appreciated by one skilled in the art that, once breakaway torque has been achieved, a lubricating film is established between the faces substantially reducing the coefficient of friction to a "running" value so that there is no danger of intermittent "grabbing" of the rubber face against the shaft.

In the further carrying out of the present invention a novel deflector arrangement is provided which serves to direct the fluid exiting from the bracing grooves to the center portion of the eddy current ring, with the flow being directed along the entire inner surface of the ring to provide a fluid-scrubbing action which causes the heat to be removed efficiently from the ring and with the fluid being thereafter directed into the annular end spaces within the dynamometer housing where the fluid circulates for cooling of the pole structure. Thus, referring to FIG. 1 a deflector is provided at each end of the housing consisting of a cylindrical deflecting member 81 and a conical deflecting member 82, the members being welded or otherwise secured together at a joint 83. It will be apparent, then, that fluid is constrained to flow within the annular spaces 41, 42 in contact with the rotating inner surface 34. The resulting drag imposed upon the fluid causes the fluid to rotate about a circular path. In addition, the centrifugal force which is exerted upon the fluid as a result of the rotation causes the fluid to flow endwise out of the end of the armature and into the annular spaces 25, 26 where the fluid continues to rotate. The turns of the spaced exciting windings 28 are peripherally oriented as shown in FIG. 2 so that the cooling fluid may readily flow between them. It will be understood, in addition, that because of turbulence, the cooling fluid is also forced between adjacent poles so that the windings and entire pole structure are maintained at a safely low temperature, even under conditions of extreme power dissipation. Finally, the cooling fluid is exhausted through a conduit 90 which is connected to a suitable pump and heat exchanger, following which the fluid is again fed to the inlet 73 in a continuous cycle. Preferably the housing is completely filled with the fluid so that the outer surface 33 as well as the end surfaces 31, 32 are also continuously scrubbed.

While the operation of the device and the resulting features and advantages will be clear from the foregoing the following summary may be helpful. The dynamometer is connected to a device such as an engine or other power source, the torque or power output of which is to be measured. Fluid is supplied through the conduit 73, thereby pressurizing the inlet chambers 72, 76 adjacent the outer ends of the bearing assemblies. The fluid is thus caused to flow through the longiutdinal grooves 60 formed in the inner faces of the rubber bearing sleeves 52. A certain amount of the fluid finds its way between the stationary sleeves 55 and the adjacent rigid sleeves 51.

As the shaft begins to rotate, because of the close fit of the rubber sleeves 52, relative movement will tend to take place at the outer surface of the rigid anti-friction sleeves 51. Upon increase in speed, the frictional drag at such surfaces is increased until the point of breakaway of the rubber sleeves is reached. The relative movement of the rubber sleeves introduces the oil and water emulsion between the sleeves and the shaft, efficiently lubricating the surfaces so that the rubber thereafter acts as an efficient high speed bearing which is cooled as well as lubricated by any axially flowing fluid. It is found that such an arrangement permits shaft speeds of up to 15,000 r.p.m. or more without wear or overheating. Moreover, the resilient rubber tends to cushion and thus absorb any vibration which may originate in the rapidly rotating armature. The resilience of the rubber makes it unnecessary to adhere to close tolerances in the alinement of the stationary bearing sleeves and makes balancing of the rotor less critical.

The fluid which is ejected from the inner ends of the two bearings is directed toward the center of the eddy current ring, flowing from the center outwardly in both directions and with substantially the entire inner surface of the eddy current ring being subjected to the fluid stream. Because of the drag of the surface 34 of the eddy current ring upon the fluid, rotation is produced accompanied by a certain amount of turbulence which makes for an efficient scrubbing action preventing the development of any localized hot spots in the eddy current ring.

The fluid exiting from the rotor, having both axial and radial components of movement, is deflected by the conical deflector plates 82 into the end spaces 25, 26 where the circular rotation continues, cooling the stationary pole structure for final discharge of the fluid through the conduit 90. Because of the extremely high speed range and torque capability of the present device, a single unit suffices to take care of a wide range of dynamometer requirements. The novel simplified structure makes it possible to build the device at low cost and no maintenance is required even when the device is operated at maximum speed and torque for long periods of time.

The term "anti-friction" as applied to the sleeve 51 refers to any rigid sleeve capable of sliding or slippage with respect to the stationary sleeve or surface which it engages. The term "rubber" applied to the sleeve 52 is intended to include various resilient materials having physical characteristics similar to rubber.

I claim as my invention:

1. In an eddy current dynamometer the combination comprising, a housing having end members for enclosing the same, means for rockably mounting said housing for measurement of the torque applied thereto, a set of magnetic pole members spaced about the interior of said housing and defining a cylindrical armature space, winding on the pole members for the setting up of a magnetic field in said space, a hollow cylindrical eddy current ring of conductive material centered within the pole members, a shaft mounting the ring, bearings in the end members for journaling the shaft, said bearings including longitudinal passages extending from the outer end to the inner end of each of them, means for conducting cooling and lubricating fluid to the outer ends of the bearings for flow through said passages and for discharge at the inner surface of the cylindrical ring for cooling the same, and means in said housing for subsequently withdrawing the fluid.

2. In an eddy current dynamometers the combination comprising a housing having end members for enclosing the same, means for rockably mounting said housing for measurement of torque developed therein, a set of pole members spaced within said housing to define a cylindrical rotor space, windings on the pole members for setting up a magnetic field in said space, a cylindrical eddy current ring of conductive material cooperating with the pole members, a shaft for mounting the ring, bearings in the end members for mounting said shaft, said bearings including a stationary sleeve in each of the end members surrounding the shaft and spaced from the latter, first and second bearing sleeves interposed between the stationary sleeve and the shaft, said first sleeve being made of anti-friction material and said second sleeve being made of rubber, means for supplying cooling and lubricating fluid to the sleeves, the rubber sleeve having a relatively tight fit with respect to the shaft so that the bearing sleeves rotate as a unit with the shaft at slow speeds of rotation and relative to said stationary sleeve, the first bearing sleeve having such clearance with respect to the stationary sleeve and presenting an extensive surface area so that as the speed is increased the drag at the stationary sleeve is sufficient to produce breakaway between the shaft and the rubber sleeve followed by continued relative movement between the shaft and the rubber sleeve.

3. In an eddy current dynamometer the combination comprising a housing having end members for enclosing the same, means for rockably mounting said housing for measurement of the torque applied thereto, a set of magnetic pole members in said housing defining a cylindrical rotor space, windings on the pole members for the setting up of a magnetic field, a cylindrical rotor centered within the pole members and made of conducting material for the setting up of eddy currents therein as the rotor is turned, a central shaft in the rotor, bearings in the end members for journaling the ends of the shaft, each of said bearings including a rigid sleeve of anti-friction material and a resilient sleeve of rubber telescoped one inside the other and each having a bearing surface at which relative slippage may take place, the resilient sleeve being grooved along the bearing surface thereof, means for admitting cooling and lubricating fluid to the grooves, said rubber sleeve having a tight fit at its bearing surface so that rotation takes place at the bearing surface of the rigid sleeve at slow speeds of shaft rotation and at the bearing surface of the rubber sleeve at higher speeds of rotation.

4. In an eddy current dynamometer the combination comprising a housing having end members for enclosing the same, means for rockably mounting said housing for measurement of the torque applied thereto, a set of magnetic pole members in said housing defining a cylindrical rotor space, windings on the pole members for the setting up of a magnetic field, a cylindrical rotor centered within the pole members and made of conducting material for the setting up of eddy currents as the rotor is turned, a central shaft in the rotor, bearings in the end members for journaling the ends of the shaft, each of said bearings including a stationary sleeve and a composite bearing sleeve, the latter comprising a rigid sleeve of anti-friction material and a resilient sleeve of rubber telescoped inside of it, the rubber sleeve having a set of longitudinal grooves along its inner surface, means for flowing cooling and lubricating fluid through the grooves, said rubber sleeve having a tight fit with respect to the shaft so that the composite sleeve tends to rotate bodily with the shaft at slow speeds of shaft rotation with slippage at the shaft as the drag of the anti-friction sleeve with respect to the stationary sleeve increases incident to higher speeds of rotation.

5. In an eddy current dynamometer the combination comprising a housing having end members for enclosing the same, means for rockably mounting said housing for measurement of the torque applied thereto, a set of magnetic pole members in said housing defining a cylindrical rotor space, windings on the pole members for the setting up of a magnetic field, a cylindrical rotor centered within the pole members and made of conducting material for the setting up of eddy currents as the rotor is turned, a central shaft in the rotor, bearings in the end members for journaling the ends of the shaft, each of said bearings including a stationary sleeve and a composite bearing sleeve, the latter comprising a rigid sleeve of anti-friction material and a resilient sleeve of rubber telescoped inside of it, the rubber sleeve having a set of longitudinal grooves along its inner surface, said rubber sleeve having a tight fit with respect to the shaft so that the composite sleeve tends to rotate bodily with the shaft at slow speeds of shaft rotation followed by slippage at the shaft as the drag of the anti-friction sleeve with respect to the stationary sleeve increases incident to higher speeds of rotation, and means for flowing cooling and lubricating fluid through the grooves for discharge inwardly of the rotor for cooling the latter.

6. In an eddy current dynamometer the combination comprising a housing having end members for enclosing the same, means for rockably mounting said housing for measurement of torque developed therein, a set of pole members spaced about the interior of the housing, windings on the pole members for setting up a magnetic field, a hollow cylindrical rotor of conductive material closely spaced with respect to said pole members for the setting up of eddy currents in the rotor as the rotor is turned, said rotor having a shaft journaled in the end members of the housing, a central spider interposed between the shaft and the hollow rotor for defining annular rotor spaces, said rotor and pole members being substantially coextensive and spaced from the ends of the housing to provide annular end spaces, means for continuously flowing cooling fluid into the rotor spaces with the fluid being rotated by the frictional drag of the rotor and passing around the ends of the rotor by reason of centrifugal force for rotation in the end spaces, and means for continuously withdrawing the fluid from the housing.

7. In an eddy current dynamometer the combination comprising a housing having end members for enclosing the same, means for rockably mounting said housing for measurement of the torque developed therein, a set of pole members spaced about the interior of the windings surrounding each of said pole members for the setting up of a magnetic field, a hollow cylindrical rotor of conductive material centered within said pole members for the setting up of eddy currents as the rotor is turned, a rotor shaft journaled in the end members, said pole members and rotor being of such axial length as to define an annular end space at each end of the housing, said rotor having means for admitting cooling fluid at the central portion thereof for discharge under the action of centrifugal force at the ends for circulation in the respective end spaces, the windings on the pole members being physically spaced and extending into said end spaces for circulation of the cooling fluid therebetween.

8. In an eddy current dynamometer the combination comprising a cylindrical housing having end members, a set of magnetic pole members in said housing defining annular end spaces, windings surrounding said pole members for the setting up of a magnetic field, a hollow cylindrical rotor of conductive material for the setting up of eddy currents therein as the rotor is turned, a rotor shaft, spider means interposed between the rotor and shaft so that substantially all of the inner surface of the rotor is exposed, means for continuously flowing lubricating and cooling fluid to within the central portion of the armature, and annular deflector means extending from within the confines of the rotor for conducting the fluid along the inner surface of the rotor and into said end spaces as it moves under the action of the frictional drag of the rotor and under the action of centrifugal force for circulation in said end spaces, and means for continuously withdrawing fluid from the housing.

9. In an eddy current dynamometer the combination comprising a housing having end members for enclosing the same, means for rockably mounting said housing for measurement of torque developed therein, a set of pole members spaced about the interior of the housing, windings on the pole members for setting up a magnetic field, a hollow cylindrical rotor of conductive material closely spaced with respect to said pole members for the setting up of eddy currents in the rotor as the rotor is turned, a rotor shaft, bearings for journaling the shaft in the end members, spider means interposed between the rotor and the shaft so that substantially all of the inner surface of the rotor is exposed, said bearings including rubber bearing sleeves telescoped over the ends of the shaft and having longitudinal grooves formed therein, means for continuously flowing lubricating and cooling fluid through said grooves for discharge of the same in side of the rotor in heat absorbing relation to the exposed inner surface, and means for continuously withdrawing the fluid from the housing.

10. In an eddy current dynamometer the combination comprising an enclosed housing having a set of pole members with windings thereon for the setting up of a magnetic field, a cylindrical rotor of conductive material, said rotor having a shaft and defining passages for the flow of cooling fluid from the center of the rotor endwise in both directions, rotor bearings journaling the end portions of the shaft and having longitudinal passages terminating at the central portion of the rotor for passing cooling and lubricating fluid, means defining chambers at the end portions of the shaft adjacent the outer ends of the respective bearings for feeding fluid into said longitudinal passages so that the fluid is employed successively for cooling and lubricating said bearings and for cooling said rotor, and means for continuously withdrawing fluid from the housing.

11. In an eddy current dynamometer the combination comprising an enclosed housing having a set of pole members with windings thereon for the setting up of a magnetic field, a cylindrical rotor of conductive material, said rotor having a shaft and defining passages for the flow of cooling fluid from the center of the rotor endwise in both directions, rotor bearings at the end portions of the shaft and having longitudinal passages terminating at the central portion of the rotor for passing cooling and lubricating fluid, means defining chambers at the outer ends of the respective bearings for feeding fluid into said longitudinal passages so that the fluid is employed successively for cooling and lubricating said bearings and for cooling said rotor, said shaft being hollow for interconnecting said chambers, means for continuously flowing fluid under pressure into one of said chambers, and means for continuously withdrawing fluid from the housing.

12. In a dynamo electric machine or the like, the combination comprising a housing, a rotor, a central shaft in the rotor, bearings for journaling the ends of the shaft, each of said bearings including a stationary sleeve and a composite bearing sleeve, the latter comprising a rigid sleeve of anti-friction material and a resilient sleeve of rubber telescoped inside of it, the rubber sleeve having a set of longitudinal grooves along its inner surface, means for flowing cooling and lubricating fluid through the grooves, said rubber sleeve having a tight fit with respect to the shaft so that the composite sleeve tends to rotate bodily with the shaft at slow speeds of shaft rotation with slippage at the shaft as the drag of the anti-friction sleeve with respect to the stationary sleeve increases incident to higher speeds of rotation.

References Cited in the file of this patent

UNITED STATES PATENTS

| | | |
|---|---|---|
| 2,188,398 | Bernard | Jan. 30, 1940 |
| 2,419,837 | Hugin | Apr. 29, 1947 |
| 2,754,683 | Waugh | July 17, 1956 |

OTHER REFERENCES

Article by Bednar, "Soft Rubber Bearings," published in Rubber Age, vol. 65, No. 2, May 1949, pages 173–179.